United States Patent
Blomberg et al.

(10) Patent No.: US 10,775,221 B2
(45) Date of Patent: Sep. 15, 2020

(54) ADAPTIVE ECHO THRESHOLD

(71) Applicant: Rosemount Tank Radar AB, Mölnlycke (SE)

(72) Inventors: Urban Blomberg, Linköping (SE); Lars Ove Larsson, Linköping (SE); Håkan Delin, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 279 days.

(21) Appl. No.: 15/720,054

(22) Filed: Sep. 29, 2017

(65) Prior Publication Data

US 2019/0101430 A1 Apr. 4, 2019

(51) Int. Cl.
| | |
|---|---|
| *G01F 23/284* | (2006.01) |
| *G01S 7/292* | (2006.01) |
| *G01S 7/00* | (2006.01) |
| *G01S 7/35* | (2006.01) |
| *G01S 13/88* | (2006.01) |
| *G01S 13/18* | (2006.01) |

(52) U.S. Cl.
CPC ............ *G01F 23/284* (2013.01); *G01S 7/006* (2013.01); *G01S 7/2922* (2013.01); *G01S 7/354* (2013.01); *G01S 13/88* (2013.01); *G01S 13/18* (2013.01)

(58) Field of Classification Search
CPC ......... G01F 23/284; G01S 7/006; G01S 7/354
See application file for complete search history.

(56) References Cited

U.S. PATENT DOCUMENTS

| | | | |
|---|---|---|---|
| 5,323,361 A | 6/1994 | Elle et al. | |
| 5,969,666 A | 10/1999 | Burger et al. | |
| 6,456,231 B1 | 9/2002 | McEwan | |
| 7,139,338 B2 | 11/2006 | Wilson et al. | |
| 7,304,687 B2 | 12/2007 | Huang et al. | |
| 2009/0146867 A1* | 6/2009 | Delin | G01F 25/0061 342/124 |
| 2010/0307251 A1 | 12/2010 | Welle et al. | |
| 2016/0153822 A1* | 6/2016 | Gorenflo | G01F 23/296 73/290 V |

FOREIGN PATENT DOCUMENTS

JP 60117150 6/1985

OTHER PUBLICATIONS

Notification of Transmittal of the International Search Report and the Written Opinion of the International Searching Authority from PCT/EP2018/076191, dated Jan. 8, 2019.

* cited by examiner

*Primary Examiner* — Marc Anthony Armand
(74) *Attorney, Agent, or Firm* — Westman, Camplin & Koehler, P.A.

(57) ABSTRACT

A radar level gauge comprising transceiver circuitry configured to obtain a tank signal including a peak representing a surface echo, and at least one peak caused by a ghost echo in a neighborhood of the surface echo. The gauge further includes a tank signal filter receiving the tank signal as input and providing an echo threshold profile, the threshold profile having at least one local maximum substantially coinciding with one of the peaks in the tank signal, and processing circuitry configured to use the echo threshold profile to disregard peaks in the tank signal which are associated with ghost reflections.
The filtering of the tank signal thus provides an adaptive threshold, which is aligned with the peak(s) in the tank signal. By using this threshold in the surface echo identification, at least some ghost echoes occurring in the tank signal may be disregarded.

16 Claims, 7 Drawing Sheets

ADAPTIVE ECHO THRESHOLD

FIELD OF THE INVENTION

The present invention relates to a method and a radar level gauge for determining a process variable such as the filling level of a product in a tank.

BACKGROUND OF THE INVENTION

A radar level gauge (RLG) is suitably used for making measurements of a process variable, e.g. a filling level, of a product such as process fluids, granular compounds and other materials contained in a tank.

An example of such a radar level gauge can include transceiver circuitry for transmitting and receiving microwaves, a signal propagating device arranged to direct microwaves towards the surface and to return microwaves reflected by the surface to the transceiver, and processing circuitry adapted to determine the filling level based on a relation between microwaves transmitted and received by the transceiver.

There are different principles for performing radar level gauges, including frequency modulated continuous wave (FMCW) and time domain reflectometry (TDR). An FMCW based RLG will emit a radar sweep with gradually varying frequency, and mix the received signal with the original signal (homodyne mixing) to form a frequency domain tank signal. A TDR based RLG will emit a pulse train of very short pulses (order of ns), and sample the received signal with the original signal in a sample and hold circuit, thereby forming a time domain tank signal.

In both cases, the tank signal will include a set of peaks indicating echoes from the tank, and one of these peaks corresponds to the echo from the surface.

The processing is configured to identify, and typically also track, the relevant echoes, in order to distinguish the surface echo from other echoes, such as reflections from structures in the tank, double bounces, etc. The surface echo can then be used to determine the distance to the surface, and consequently the filling level.

However, each echo will typically also result in a series of smaller "ghost" echoes, flanking the "actual" echo. Such ghost echoes may be caused by imperfections in the RLG electronics, and may interfere with the echo identification. For example, a the processing circuitry may confuse the ghost echoes with actual echoes, and spend computation resources on tracking these ghost echoes. Further, the ghost echoes may reduce performance when the surface passes a structure in the tank, i.e. when the surface echo for a period of time is very close to, or completely coincides with, a stronger echo from the reflecting structure.

GENERAL DISCLOSURE OF THE INVENTION

It is an object of the present invention to mitigate the above problems, and provide a radar level gauge having tank signal processing which reduces the negative impact of ghost echoes.

According to a first aspect of the present invention, this and other objects are achieved by a radar level gauge for determining a process variable of product in a tank, the gauge comprising transceiver circuitry configured to generate and transmit an electromagnetic transmit signal $S_T$, receive an electromagnetic return signal reflected from the tank, and combine the return signal with the transmit signal to form a tank signal including a plurality of peaks representing echoes from the interior of the tank, one of the peaks representing a surface echo, and at least one peak caused by a ghost echo in a neighborhood of the surface echo. The gauge further includes a tank signal filter receiving the tank signal as input and providing an echo threshold profile, the threshold profile having at least one local maximum substantially coinciding with one of the peaks in the tank signal, and processing circuitry configured to distinguish a surface echo from other echoes in the tank signal and, determine the process variable based on the surface echo, wherein the processing circuitry is configured to use the echo threshold profile to disregard peaks in the tank signal which are associated with ghost reflections.

According to a second aspect of the present invention, this and other objects are achieved by a method for determining a process variable of product in a tank, comprising the steps of generating an electromagnetic transmit signal and allowing it to propagate into the tank, receiving an electromagnetic return signal caused by a reflection of the transmit signal in the tank, combining the return signal with the transmit signal to form a tank signal, the tank signal including a plurality of peaks representing echoes from the interior of the tank, one of the peaks representing a surface echo, and at least one peak caused by a ghost echo in a neighborhood of the surface echo, filtering the tank signal to provide an echo threshold profile, the threshold profile having at least one local maximum substantially coinciding with one of the peak in the tank signal, and processing the tank signal to distinguish the surface echo from other echoes, and determine the process variable based on the surface echo, wherein the echo threshold profile is used in the processing to disregard peaks in the tank signal which are associated with ghost echoes.

The filtering of the tank signal thus provides an adaptive threshold, which is aligned with the peak(s) in the tank signal. By using this threshold in the surface echo identification, at least some ghost echoes occurring in the tank signal may be disregarded.

As mentioned above, such ghost echoes may be caused by imperfections in the transceiver electronics, and may reduce the performance of the radar level gauge. In particular, as ghost echoes associated with the surface echo will present the same type of behavior as the surface echo, such ghost echoes may be mistaken for the surface echo when the surface passes a structure in the tank causing an interfering echo.

Contrary to many other thresholds applied the processing, for example signal-to-noise thresholds applied in CFAR processing, the filter according to the present invention is applied before any peaks in the tank signal have been identified. As a consequence, the invention leads to identification of fewer peaks in the tank signal, and the processing thus requires less computational power.

In a particular embodiment, the processing of the tank signal includes: identifying a set of echoes, and selecting the surface echo as one of the echoes in the set. In such a case, the threshold profile serves to reduce a number of echoes in the set, thus clearly simplifying the processing.

The threshold profile may have a continuous derivative, i.e. have a smooth shape free from discontinuities and sharp corners. Such a threshold profile is quite different from prior art thresholds, which typically are a single constant threshold or a set of different, piecewise constant, thresholds.

The filter may include a set of adjustable parameters, which adjustable parameters may be set based on characteristics of ghost echoes known to occur in the specific implementation. By adjusting these parameters, the filter can thus be specifically configured to effectively eliminate ghost echoes.

The invention may be implemented in a non-contact RLG as well as in a guided wave radar level gauge, and in combination with FMCW processing as well as time domain reflectometry (TDR).

BRIEF DESCRIPTION OF THE DRAWINGS

The present invention will be described in more detail with reference to the appended drawings, showing currently preferred embodiments of the invention.

FIGS. 5a-5f show tank signals corresponding to six distinct points in time in the diagram in FIG. 4a.

DETAILED DESCRIPTION OF PREFERRED EMBODIMENTS

Figure 1A:
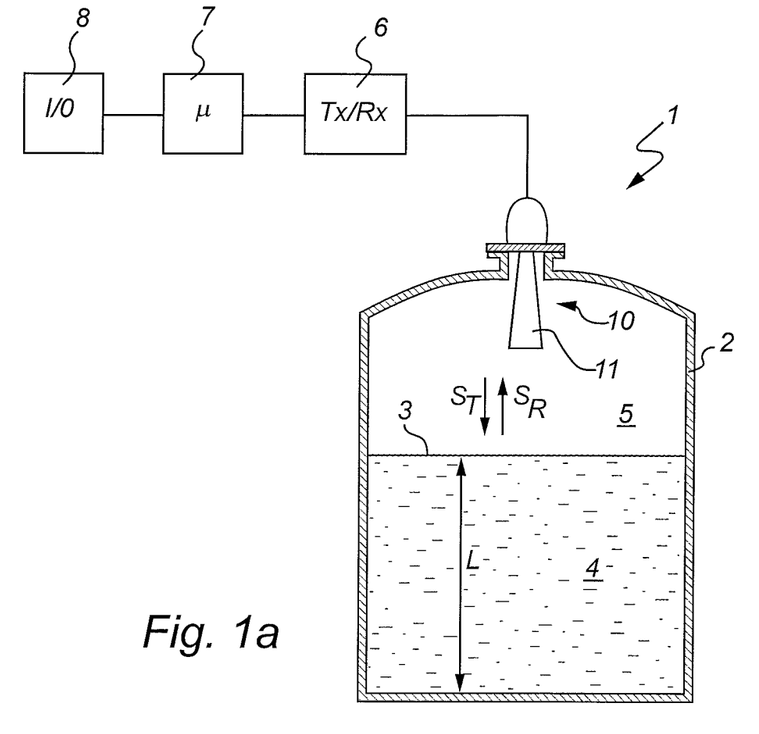
FIGS. 1a and 1b schematically illustrate two types of radar level gauges suitable for implementing the present invention.
Figure 1B:
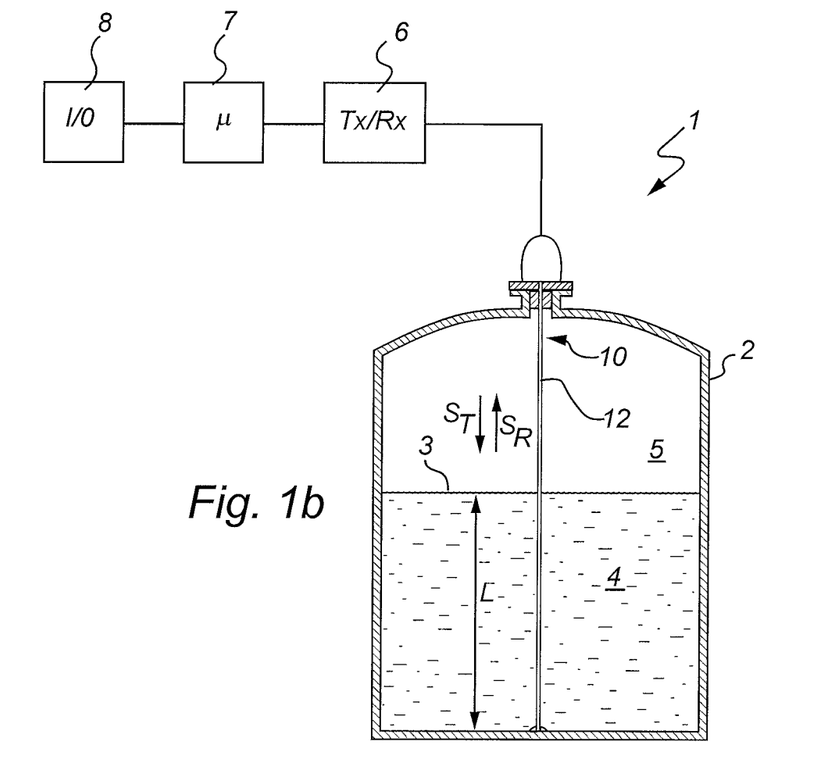

FIG. 1a-1b show two examples of a radar level gauge (RLG) 1 where the present invention may be applied. The RLG 1 is mounted on a tank 2, and arranged to perform measurements of a process variable such as the level L of an interface between two materials 4, 5 in the tank 2. Typically, the first material is a liquid 4 stored in the tank, e.g. gasoline, while the second material is air or other atmosphere 5 in the tank. In that case, the interface is simply the surface 3 the product.

The radar level gauge 1 includes transceiver circuitry 6 connected to processing circuitry 7.

The transceiver circuitry 6 may be one functional unit capable of transmitting and receiving electromagnetic signals, or may be a system comprising separate transmitter and receiver units. The elements of the transceiver circuitry 6 are typically implemented in hardware, and form part of an integrated unit normally referred to as a microwave unit. For simplicity, the transceiver circuitry is referred to as the "transceiver" in the following description.

The processing circuitry 7 may include a combination of analogue processing realized in hardware, and digital processing realized embodied by software modules stored in a memory and executed by an embedded processor. The invention is not restricted to the particular realization, and any implementation found suitable to realize the herein described functionality may be contemplated.

The transceiver 6 is electrically connected to a suitable signal propagation device 10, arranged to allow electromagnetic signals to propagate towards the surface 3 of the product 4, and to return a reflection of the electromagnetic signals from the tank. The transceiver 6 is configured to generate and transmit electromagnetic transmit signals Sr which are propagated towards the surface 3 of the product 4 by the signal propagation device. Electromagnetic return signals $S_R$ are caused by a reflection in the surface 3, and are returned by the signal propagation device 10 and fed back to the transceiver 6.

The processing circuitry 7 is configured to determine the distance between a reference position at the top of the tank and the surface 3 by analyzing the transmit signal $S_T$ and the return signal $S_R$. The processing typically includes generation of a tank signal or "echo curve", including a plurality of peaks representing echoes from the interior of said tank. One of the peaks represent an echo from the surface 3.

In case of a frequency domain tank signal, the amplitude of the signal is expressed as a function of frequency, where the frequency is related to the distance from the reference position. In case of a time domain tank signal, the amplitude of the signal is expressed as a function of time, where the time is related to the distance from the reference position. As will be described in more detail below, the tank signal is analyzed by the processing circuitry to identify the surface echo and to determine the distance to the surface based on the location of the surface in the tank signal. Based on the determined distance to the surface 3, generally referred to as ullage, and known dimensions of the tank 5, a process variable such as the filling level L of the tank can be deduced.

The RLG 1 further comprises an interface 8 for communication of a measurement value externally of the RLG and optionally for power supply of the RLG. For example, the interface 8 may be a two-wire control loop, such as a 4-20 mA loop. The interface 8 may also include a serial data bus, allowing communication using a digital communication protocol. Examples of available digital protocols include HART, Modbus, Profibus and Foundation Fieldbus. The interface 8 may also be a wireless interface, employing e.g. wireless HART.

In FIG. 1a, the signal propagation device 10 is a free-propagating directional antenna 11, and the RLG 1 is referred to as a non-contact radar (NCR) level gauge. Sometimes the antenna is coupled to a wave guiding structure in the form of a pipe (referred to as a "still pipe") in order to reduce interference and to ensure a calm surface.

In FIG. 1b, the signal propagation device 10 is a probe 12, i.e. a transmission line extending into the content of the tank. In this case the transmit signal and echo signal will propagate along the probe until they are reflected by the impedance discontinuity caused by the surface 3. An RLG with a probe is sometimes referred to as guided wave radar (GWR) level gauge. Several types of probes, for example single-line (Goubau-type), coaxial, and twin-line probes may be used. The probes may be essentially rigid or flexible and they may be made from metal, such as stainless steel, plastic, such as PTFE, or a combination thereof.

The transmit signal in a NCR level gauge, such as the one illustrated in FIG. 1a, is typically in the GHz range, e.g. around 6 GHz or 26 GHz, with a band-width of one or several GHz. The transmit signal in a GWR, such as the one illustrated in FIG. 1b, is typically a DC pulse train, although high frequency signals may also be used.

According to one measuring principle, the transmit signal is a continuous signal with varying frequency (frequency modulated continuous wave, FMCW). An FMCW based RLG will emit a radar sweep with gradually varying frequency, and mix the received signal with the original signal (homodyne mixing) to form a frequency domain tank signal. This principle is mostly used with NCR level gauges, but applications also to GWR have been proposed.

According to another measurement principle, the transmit signal is a train of distinct pulses with a duration in the order of ns and a repletion frequency in the order of MHz. The return signal is sampled with the original pulse train in a sample and hold circuit in a process known as time domain reflectometry (TDR), thereby forming a time domain tank signal. Time domain reflectometry is commonly used with GWR level gauges, in which case the pulses may be DC pulses. The principle may also be used for NCR level gauges, in which case the pulses need to be frequency modulated to allow emission with a directional antenna.

The transmit signal may also be some combination of FMCW and a pulsed signal. For example, a principle known as multiple frequency pulsed wave (MFPW) has been proposed.

Figure 2:
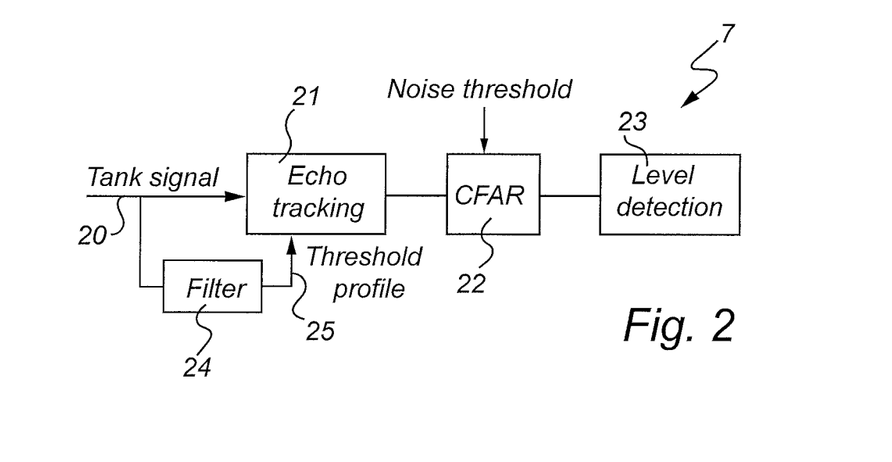
FIG. 2 is a schematic block diagram of the processing circuitry in FIGS. 1a and 1b, according to an embodiment of the present invention.

Turning to FIG. 2, the processing circuitry 7 is illustrated in more detail.

The processing circuitry 7 includes an echo tracking module 21, which is configured to receive the tank signal 20 and identify local maxima (peaks) in the tank signal which are considered to be caused by reflections. The echo tracking module is further configured to store the position of the identified echoes between consecutive measurements, resulting in a tracking of a plurality of echoes. The processing circuitry may further include a S/N-module 22, connected to the echo tracking module 21 and configured to apply a signal-to-noise threshold in order to eliminate identified echoes which have a signal-to-noise ratio below this threshold. As an example of such a module is a constant false alarm rate (CFAR) module. A level detection module 23 is connected to receive the remaining echoes, and is configured to determine which of the tracked echoes that is caused by a reflection in the surface (surface echo). The position of the identified surface echo in the tank signal corresponds to a distance to the surface, which in turn may be used to determine a process variable such as the filling level L.

According to an embodiment of the present invention, the processing circuitry further includes a filter 24, connected to receive the tank signal and to provide an echo threshold profile 25 based on the tank signal. The output of the filter 24 is connected to the echo tracking module 21, which is here configured to use the threshold profile to disregard peaks in the tank signal which are associated with ghost reflections.

In principle, the echo threshold profile may be applied to remove all parts of the tank signal which do not exceed the echo threshold profile, while leaving other parts unchanged. Alternatively, the echo threshold profile is simply subtracted from the tank signal. Other ways to use the echo threshold to remove or attenuate ghost echoes in the tank signal may also be possible.

Figure 3A:
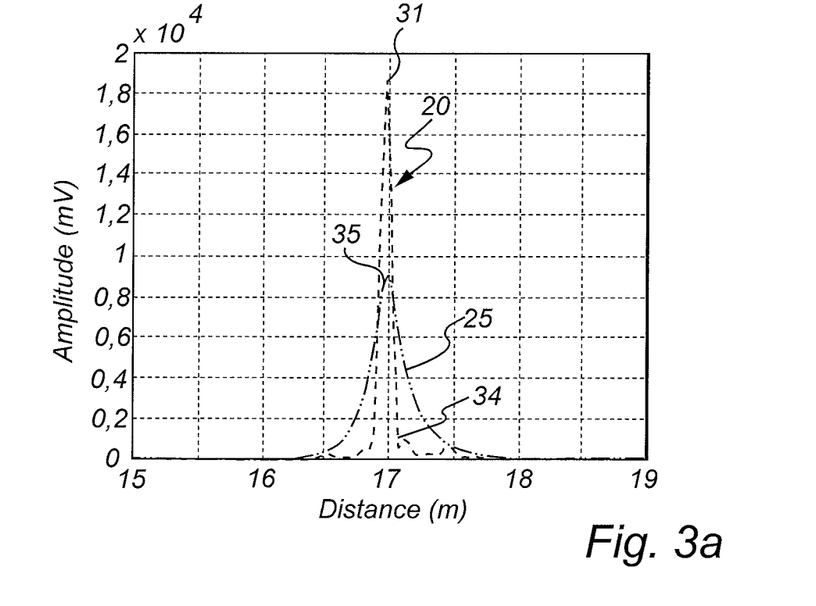
FIGS. 3a and 3b illustrate portions of a tank signal and corresponding portions of a threshold profile.
Figure 3B:
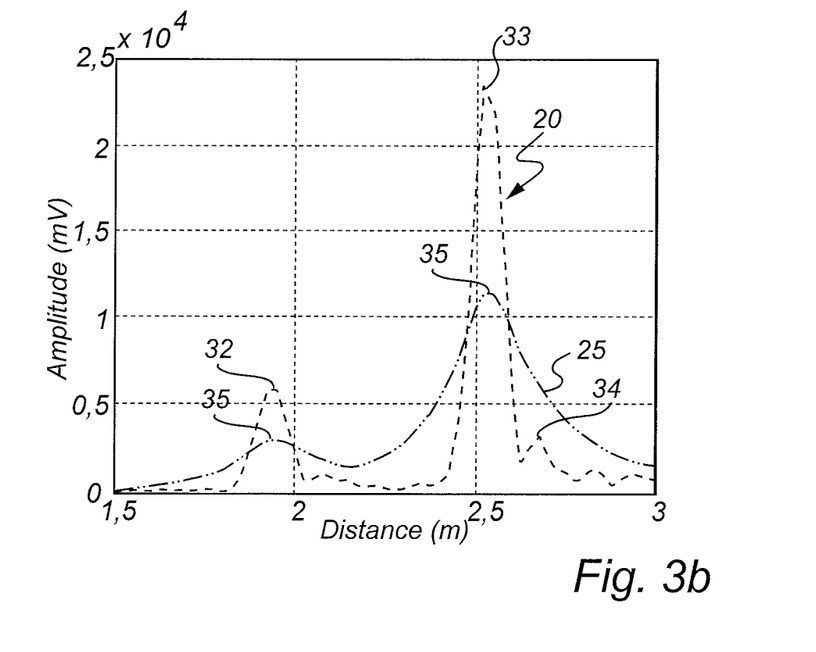

FIGS. 3a and 3b show two portions of a tank signal 20 and corresponding threshold profile 25. The tank signal is here illustrated as a function of distance in meter. However, as mentioned above, the tank signal may be originally be a function of frequency (e.g. in an FMCW system) or a function of time (e.g. in a TDR system).

As mentioned above, the tank signal includes a peak 31 corresponding to a reflection from the surface 3, here at around 17 m. In addition to this surface echo, a tank signal may further include several other echoes caused e.g. by fixed structures in the tank, and echoes caused by reflections reaching the propagation device after multiple bounces in the surface and/or tank walls. In the illustrated case, there are two such additional echoes 32, 33, occurring at around 1.95 m and 2.55 m. The tank signal typically also includes one or several "ghost" echoes 34 associated with each "actual" echo 31, 32, 33. The ghost echoes are caused by imperfections in the transceiver circuitry, and generally do not contribute to the level detection process.

As can be seen from FIGS. 3a, 3b, the threshold profile 25 has a local maximum 35 aligned with each peak 31, 32, 33 of the tank signal 20, and a generally decaying level on either side of these local maxima 35. In the illustrated case, the threshold profile 25 forms a series of bell shapes, one bell shape for each peak 31, 32, 33.

The filter 24 can be applied as a linear filter with low pass characteristics. To align the maximums in the threshold profile with the peaks in the original tank signal, the filter must be non-causal. One way to achieve such a filter is to run a first order IIR filter over the peaks in the tank signal for both for increasing and decreasing distances (i.e. twice).

The filter may be parameterized, for example including parameters representing magnitude (as ratio of peak), width above peak, and width below peak. With these parameters, the threshold profile may be chosen to be symmetric around each peak, or to be asymmetric, e.g. decreasing quicker on one side of the peak. These parameters may be set based on knowledge about the characteristics of ghost echoes in a particular implementation, so as ensure that the resulting threshold profile exceeds the ghost echoes surrounding a strong peak. As a consequence, ghost echoes in the neighborhood of a strong peak may be cancelled by the echo tracking module.

Figure 4A:
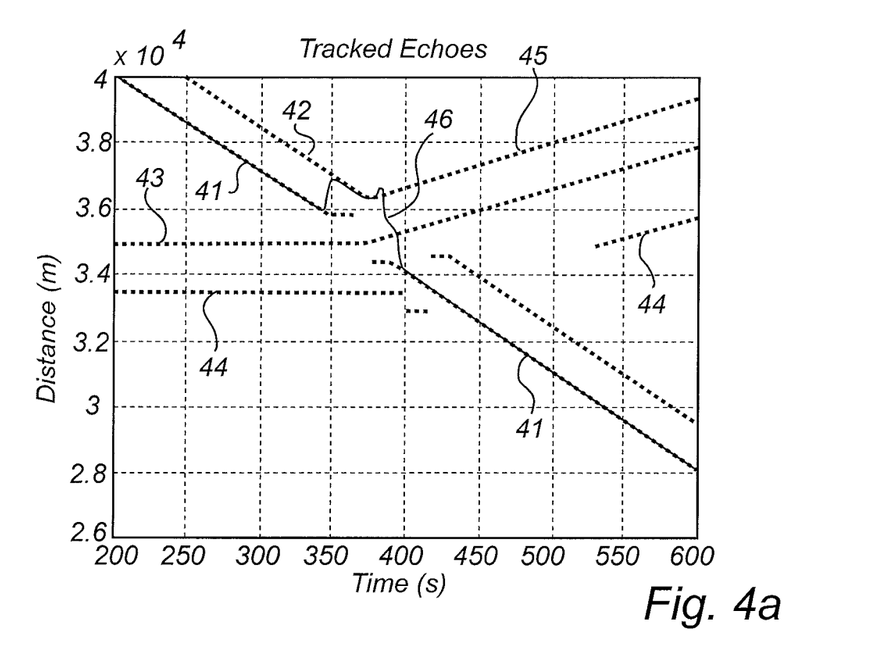
FIGS. 4a and 4b are diagrams indicating echoes and distance to surface tracked over time.

FIG. 4a shows the results of the processing in the echo tracking module 21 and the level detection module 23 for a gradually increasing filling level (decreasing distance to surface) in a tank with a fixed structure causing a reflection. FIGS. 5a-5f shown the corresponding tank signal 20 for six discrete points in time, t=320 s, t=341 s, t=389 s, t=400 s, t=420 s, and t=450 s.

In FIG. 4a, the dotted curves 41-45 indicate five different echoes 51-54 that are identified and tracked over time by the echo tracking module 21, while the solid curve 46 indicates the detected surface distance over time, as determined by the level detection module 23. The curve 41 is the surface echo 51, curve 42 is a ghost echo 52 appearing slightly below the surface echo (i.e. at greater distance from the reference position), curve 43 is an interfering echo 53 caused by a reflection from the fixed structure, curve 44 is a ghost echo 54 appearing slightly above the interfering reflection (i.e. at smaller distance from the reference position), and curve 45 is a ghost echo 55 appearing slightly below the interfering reflection (i.e. at greater distance from the reference position). It should be noted that when the surface exceeds the fixed structure (at around t=375 s) the signals which are reflected by the fixed structure will pass through a layer of product which causes a delay. As a result, the echo 53 appears to be moving away from the reference position (increasing distance), hence the "knee" in curve 43.

At t=320 s (FIG. 5a) the surface echo 51 and the interfering echo 53 are clearly distinguishable.

At t=341 s (FIG. 5b), as the surface echo 51 approaches the interfering echo 53, the two echoes are no longer distinguishable, and FIG. 4a shows how the level detection module 23 mistakes the ghost echo 52 as the surface echo 51. As a consequence, the surface distance curve 46 coincides with curve 42 for a period of time.

At t=389 s (FIG. 5c), the surface echo 51 is beginning to emerge on the left side of the interfering echo 53, but is still not distinguishable.

At t=400 s (FIG. 5d) the surface echo 51 is again distinguishable, and the level detection module 23 again "finds" the surface echo 51. From now on, the surface distance curve 46 again coincides with the surface echo curve 41.

At t=420 s (FIG. 5e) the surface echo is even more separated from the interfering echo 53, and the interfering echo 53 has also started to move further away as it is being submerged in the product 4.

At t=450 s (FIG. 5f) also the ghost echo 52 is clearly distinguishable from the interfering echo 53.

Figure 4B:
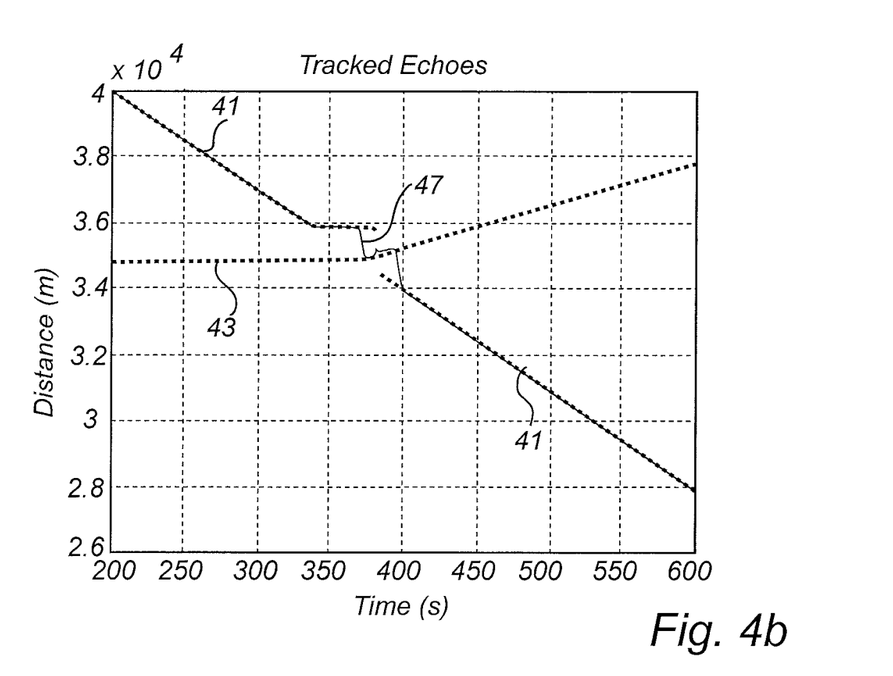
Figure 5A:
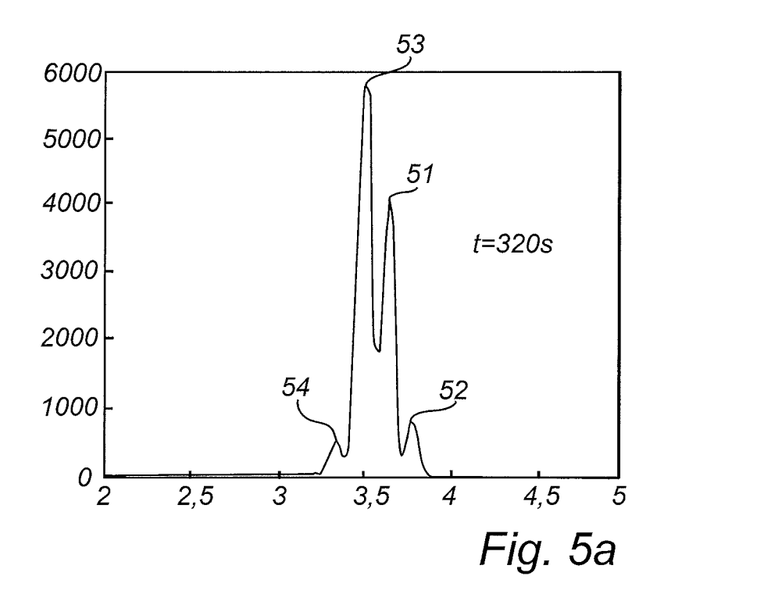
Figure 5B:
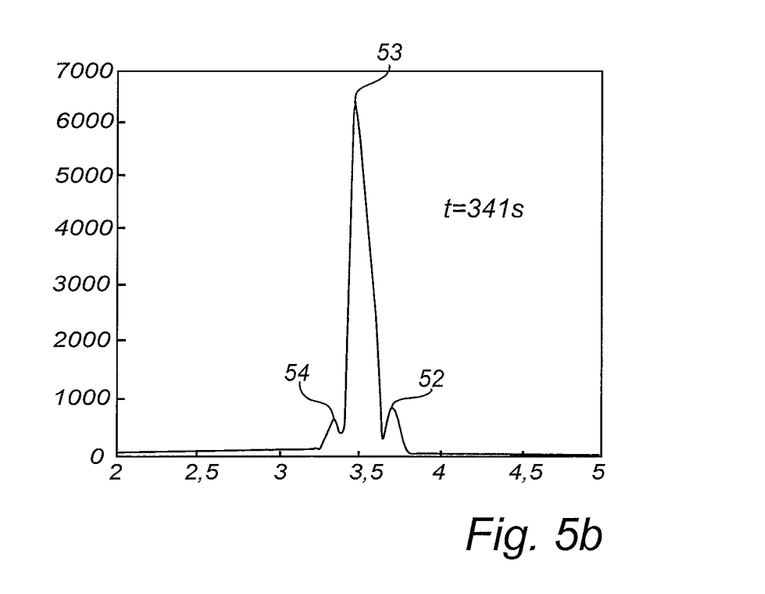
Figure 5C:
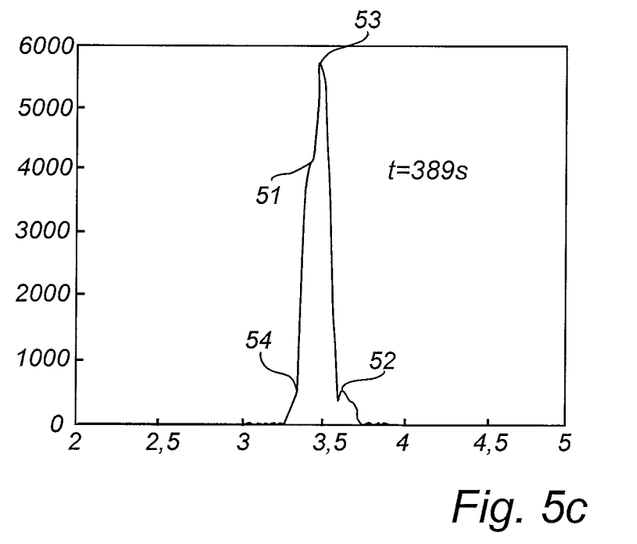
Figure 5D:
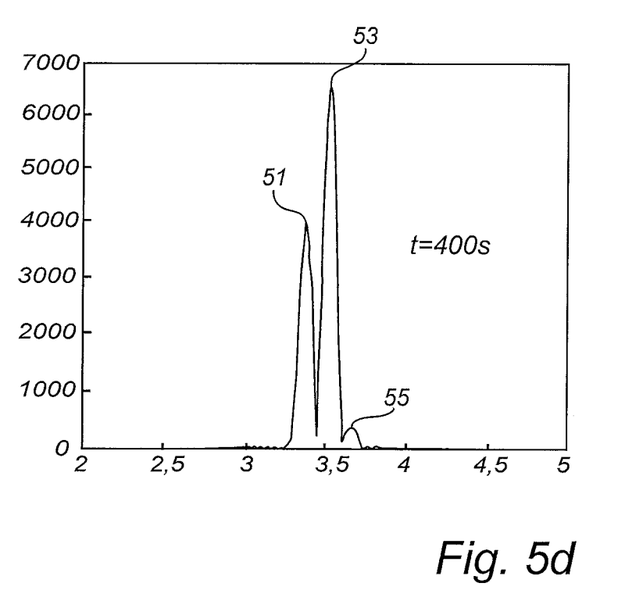
Figure 5E:
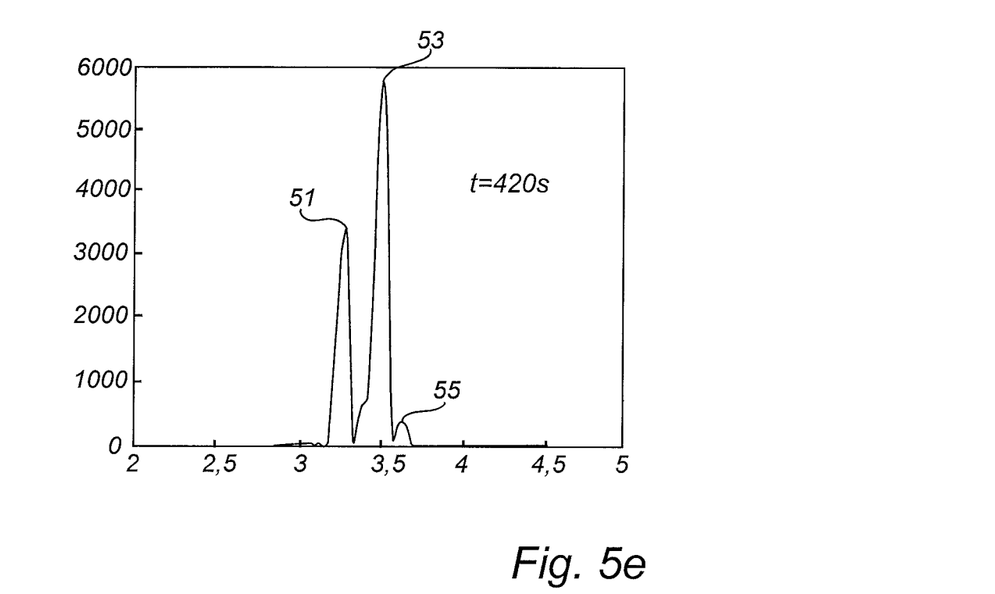
Figure 5F:
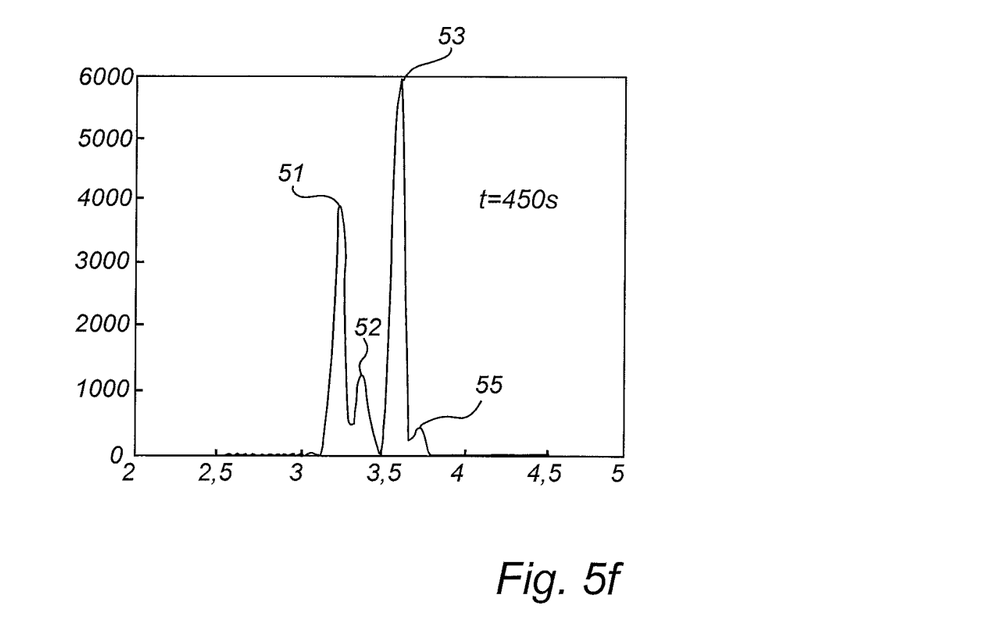

FIG. 4b shows the measurement, but here the echo tracking module 21 has used a threshold profile according to the present invention to eliminate ghost echoes 52 and 54. In FIG. 4b, therefore, only echo curves 41 and 43 and a (slightly different) detected surface distance 47 are present in the diagram. The processing of the echo tracking module 21 is thus significantly facilitated.

As there is no ghost echo curve 42, the surface distance curve 47 here follows the surface echo curve until around 375 s, at which point the level detection module 23 mistakes the interfering echo 53 as the surface echo 51. Also in this case, it is not until around 400 s that the level detection module 23 again "finds" the surface echo 51.

When comparing the surface distance curves 46 (in FIG. 4a) and 47 (in FIG. 4b) it is clear that the deviation from a theoretical level detection (i.e. a straight line) is significantly greater in FIG. 4a than in FIG. 4b.

The person skilled in the art realizes that the present invention by no means is limited to the preferred embodiments described above. On the contrary, many modifications and variations are possible within the scope of the appended claims. For example, more complex filter functions may be employed to obtain the threshold profile.

What is claimed is:

1. A radar level gauge for determining a distance to a surface of a product in a tank, said gauge comprising:
    transceiver circuitry configured to:
        generate and transmit an electromagnetic transmit signal $S_T$,
        receive an electromagnetic return signal reflected from the tank, and
        combine the return signal with the transmit signal to form a tank signal, said tank signal including a plurality of peaks representing echoes from the interior of said tank, one of said peaks representing a surface echo, and at least one peak caused by a ghost echo in a neighborhood of said surface echo;
    a tank signal filter receiving said tank signal as input and providing an echo threshold profile, said echo threshold profile representing a threshold as a function of distance to the surface and having at least one local maximum substantially coinciding with one of said peaks in said tank signal;
    an echo tracking module configured to receive said tank signal and said echo threshold profile, and to identify a surface echo in the tank signal by comparison with said echo threshold profile, thereby disregarding peaks in said tank signal which are associated with ghost reflections; and
    processing circuitry configured to:
        determine said distance based on said surface echo.

2. The radar level gauge according to claim 1, wherein said processing circuitry is configured to distinguish a surface echo from other echoes in the tank signal by:
    identifying a set of echoes in the tank signal, and
    selecting said surface echo as one of the echoes in said set, wherein said threshold profile serves to reduce a number of echoes in said set.

3. The radar level gauge according to claim 1, wherein said echo threshold profile has a continuous derivative.

4. The radar level gauge according to claim 1, wherein the filter is parametrized, and includes parameters representing at least width above peak and width below peak, said parameters being selected to ensure that the resulting threshold profile exceeds ghost echoes surrounding a strong peak.

5. The radar level gauge according to claim 1, further including a directional antenna connected to the transceiver circuitry, said directional antenna intended to be mounted in a top of said tank to emit the transmit signal towards said surface.

6. The radar level gauge according to claim 1, further including a transmission line probe connected to the transceiver circuitry, said transmission line probe intended to be suspended in the tank and extend beyond said surface.

7. The radar level gauge according to claim 1, wherein said tank signal is a frequency domain signal.

8. The radar level gauge according to claim 7, wherein said transmit signal is a frequency modulated continuous wave (FMCW).

9. The radar level gauge according to claim 1, wherein said transmit signal is a train of distinct pulses, and said tank signal is a time domain signal.

10. A method implemented in a radar level gauge, for determining a process variable of product in a tank, comprising the steps of:
    generating an electromagnetic transmit signal and allowing it to propagate into the tank,
    receiving an electromagnetic return signal caused by a reflection of said transmit signal in the tank,
    combining the return signal with the transmit signal to form a tank signal, said tank signal including a plurality of peaks representing echoes from the interior of said tank, one of said peaks representing a surface echo, and at least one peak caused by a ghost echo in a neighborhood of said surface echo,
    filtering the tank signal to provide an echo threshold profile, said threshold profile representing a threshold as a function of distance to the surface and having at least one local maximum substantially coinciding with one of said peak in said tank signal, and
    processing said tank signal to distinguish said surface echo from other echoes, and determine said process variable based on said surface echo,
    wherein said echo threshold profile is used in said processing to disregard peaks in said tank signal which are associated with ghost echoes.

11. The method according to claim 10, wherein the step of processing the tank signal includes:
    identifying a set of echoes, and
    selecting said surface echo as one of the echoes in said set, wherein said echo threshold profile serves to reduce a number of echoes in said set.

12. The method according to claim 10, wherein said echo threshold profile has a continuous derivative.

13. The method according to claim 10, wherein the step of filtering the tank signal includes applying a filter having a set of adjustable parameters, and wherein said adjustable parameters are set based on characteristics of ghost echoes occurring in a particular radar level gauge.

14. The method according to claim 10, wherein said tank signal is a frequency domain signal.

15. The method according to claim 14, wherein said transmit signal is a frequency modulated continuous wave (FMCW).

16. The method according to claim 10, wherein said transmit signal is a train of distinct pulses, and said tank signal is a time domain signal.

\* \* \* \* \*